(12) United States Patent
Pedersen (10) Patent No.: US 8,992,178 B2
(45) Date of Patent: Mar. 31, 2015

(54) HANDLING A WIND TURBINE NACELLE

(75) Inventor: Gunnar Kamp Storgaard Pedersen, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 834 days.

(21) Appl. No.: 13/202,276

(22) PCT Filed: Feb. 18, 2010

(86) PCT No.: PCT/DK2010/050042
§ 371 (c)(1),
(2), (4) Date: Aug. 18, 2011

(87) PCT Pub. No.: WO2010/094287
PCT Pub. Date: Aug. 26, 2010

(65) Prior Publication Data
US 2011/0299997 A1   Dec. 8, 2011

(30) Foreign Application Priority Data
Feb. 20, 2009   (DK) .................................. 2009 00231

(51) Int. Cl.
*F03D 11/00*   (2006.01)
*F03D 1/00*   (2006.01)
(Continued)

(52) U.S. Cl.
CPC ................ *F03D 1/001* (2013.01); *B66C 1/108* (2013.01); *B66C 1/12* (2013.01); *F03D 11/00* (2013.01);
(Continued)

(58) Field of Classification Search
USPC .............. 416/142, 146 R, 244 R, 244 A, 246, 416/DIG. 6; 29/281.1, 889, 889.1, 889.2, 29/434, 559; 294/68.1, 68.21, 68.3, 74; 269/55, 60
See application file for complete search history.

(56) References Cited

U.S. PATENT DOCUMENTS

| 4,541,662 A | * | 9/1985 | Berg ............................ 294/82.1 |
| 5,598,803 A | | 2/1997 | Czipri |
| 5,884,950 A | * | 3/1999 | Fredriksson ............... 294/82.11 |
| 6,648,388 B2 | * | 11/2003 | Fredriksson .................... 294/74 |

FOREIGN PATENT DOCUMENTS

| DE | 200 18 890 | 12/2001 |
| DE | 10 2006 001 931 | 7/2007 |

(Continued)

OTHER PUBLICATIONS

Johannes Ahrenkiel-Frellsen; 1st Technical Examination and Search Report issued in priority Denmark Application No. PA 2009 00231; Oct. 6, 2009; 4 pages; Denmark Patent and Trademark Office.
(Continued)

*Primary Examiner* — Christopher Verdier
(74) *Attorney, Agent, or Firm* — Wood, Herron & Evans, LLP (57) ABSTRACT

In order to increase safety, flexibility and simplicity when handling a wind turbine nacelle compared to known solutions and devices, there is disclosed a wind turbine nacelle including a supporting structure, a nacelle housing and a plurality of handling devices to be used when handling the wind turbine nacelle. The four handling devices are connected to the supporting structure, and each of the handling devices includes an integrated moveable part. The integrated moveable part is moveable between a first position and a second position, and the integrated moveable part is inside or is flush with the nacelle housing in the first position and is extending out of the nacelle housing in the second position.

18 Claims, 5 Drawing Sheets

(51) Int. Cl.
  *B66C 1/10* (2006.01)
  *B66C 1/12* (2006.01)

(52) U.S. Cl.
  CPC ......... *F05B 2230/61* (2013.01); *F05B 2240/14* (2013.01); *Y02E 10/722* (2013.01); *Y02E 10/726* (2013.01); *Y02E 10/728* (2013.01); *Y10S 416/06* (2013.01)
  USPC ................... 416/146 R; 416/244 R; 416/246; 416/DIG. 6; 29/281.1; 29/434; 29/559; 294/68.21; 294/68.3; 294/74; 269/55; 269/60

(56) References Cited

FOREIGN PATENT DOCUMENTS

EP     1 101 934     5/2001
WO     2008/000267   1/2008

OTHER PUBLICATIONS

Marcin Krol; International Search Report and Written Opinion issued in priority International Application No. PCT/DK2010/050042; Feb. 17, 2011; 11 pages; European Patent Office.

* cited by examiner

HANDLING A WIND TURBINE NACELLE

FIELD OF THE INVENTION

The invention relates to handling a wind turbine nacelle and devices for handling a wind turbine nacelle. In particular, the invention relates to handling the wind turbine nacelle by lifting it with a crane or the like.

BACKGROUND OF THE INVENTION

In a modern wind turbine, a nacelle is a more or less rectangular housing adapted to be positioned on top of a wind turbine tower and finally to house and cover elements such as main bearings, a main shaft, a gearbox, a generator and a supporting structure for such elements. In some wind turbine constructions, one or more of the mentioned elements, such as the gearbox, may not be needed. When a wind turbine is assembled on a site, the nacelle is positioned on top of the wind turbine tower by connecting the supporting structure or intermediate elements such as a yaw bearing of the nacelle with the tower.

During and after production of the nacelle, the nacelle has to be handled a number of times. It is necessary to move the nacelle one or more times, such as in the following situations; within the production facility, from the production facility to a storage facility, from the storage facility to a transport device, from the transport device to another intermediate transport or storage device, and from a final transport device or even from a position on the ground at an erection site and to its final position on top of the wind turbine tower.

Typical length, height and width of the nacelle are around 15000 mm×4000 mm×3300 mm. A typical weight of the wind turbine nacelle is in the interval of 50 to 150 tons, among others depending on the size of the wind turbine for which the nacelle is provided and the materials used for the nacelle.

When handling the nacelle in a plurality of situations as described, it is of utmost importance that handling takes place as safely as possible for personnel and for the nacelle itself. Furthermore, it is of utmost importance that handling the nacelle can be carried out rapidly and precisely.

A way of handling a nacelle is to attach soft slings to lifting points of the nacelle. The nacelle is subsequently lifted by a crane or the like by pulling the soft slings.

The inventors of the present invention have found that known solutions, at least to some extent, fail to provide either a safe handling of the nacelle or a fast or precise handling of the nacelle. Attempts to succeed in providing one or more of these factors have often led to a decrease of an ability to succeed in providing one or more of the other factors. It has also been seen that known solutions increase the cost of the handling devices or that they decrease the flexibility of how to handle the nacelle to a level which is not satisfactory to the wind turbine companies or the companies handling the nacelle. In consequence, the present invention is provided.

SUMMARY OF THE INVENTION

It may be seen as an aim of the present invention to provide an improved wind turbine nacelle and an improved method of moving a wind turbine nacelle. Preferably, the invention alleviates, mitigates or eliminates one or more of the above or other disadvantages singly or in any combination.

In particular, it may be seen as an object of the invention to provide a solution where safety, flexibility and simplicity is increased when handling the nacelle compared to known solutions.

Accordingly there is provided, in a first aspect, a wind turbine nacelle comprising
  a supporting structure,
  a nacelle housing,
  at least four handling devices to be used when handling the wind turbine nacelle, the at least four handling devices being connected to the supporting structure, wherein each of the at least four handling devices comprises an integrated moveable part, and wherein the integrated moveable part is moveable between a first position and a second position, where the integrated moveable part is inside or is flush with the nacelle housing in the first position and is extending out of the nacelle housing in the second position.

Thus, an improved wind turbine nacelle is provided. An improvement or advantage may lie therein that when providing handling devices as described a safe, flexible and simple solution is provided to handle the nacelle. The flexibility may be given by the fact that the integrated moveable part is extending out of the nacelle housing in the second position, and hereby numerous different types of soft slings or the like used for lifting the nacelle via the handling devices can be used.

The simplicity and/or safety of the solution may be given by the fact that, e.g., in order to secure soft slings to the nacelle for handling or lifting the nacelle, personnel simply attach and possibly secure one or more soft slings to the extending moveable part. This may particularly be helpful when the only access to the interior of the nacelle is in a roof of the nacelle which may be 4 meters above ground level.

The simplicity and/or safety and/or flexibility of the solution may alternatively or additionally be given by the fact that even though the soft sling may be provided and possibly attached by personnel from the outside of the nacelle it may also be attached to the integrated moveable part from the inside. This may, as an example, be provided by reaching out for the soft sling and attaching the soft sling around or to an integrated moveable part in its first or second position.

Lifting of the nacelle via the soft slings is then provided when the integrated moveable part is in its second position. The safety may alternatively or additionally be given by the fact that e.g. compared to a solution where a hook, or the like, is to be lowered through an opening in the top of the nacelle housing and attached to a suitable part of the supporting structure in the nacelle, with the disclosed solution it is possible to decrease the risk that any personnel get hit by a hook or the like. A reason for this may be, in a situation where the soft slings are attached and secured from inside the nacelle, that personnel are guarded by a roof of the nacelle housing. Still further, a risk of attaching the soft sling or hook wrongly is minimized in that the integrated moveable part is a rather distinctive member.

When the at least four handling devices are positioned and provided in order for the integrated moveable part to be able to extend out of opposing sides of the nacelle housing in the second position, a possible advantage is that a solution which is simpler or safer to use when compared to handling devices extending out of e.g. a top of the nacelle.

When the at least four handling devices are provided and positioned in order for the integrated moveable part to be able to extend out of the lower half part of sides of the nacelle housing, a possible advantage is that a soft sling may be secured by personnel standing on the ground next to the nacelle or standing on a floor inside the nacelle housing.

When the at least four handling devices are positioned adjacent to a bottom part of the supporting structure, a possible advantage is that the handling devices are hereby simple to connect to the supporting structure of the nacelle, such as a bottom plate.

When two handling devices are positioned on or adjacent to each of two sides of the wind turbine nacelle, a possible advantage is that a simple way of lifting or handling the nacelle may hereby be provided.

When the integrated moveable part of the handling device comprises a structure adapted to transfer load to a soft sling, such as a form where a soft sling is prevented from slipping off the moveable part, when surrounding or otherwise attached to the moveable part, a preferred form and function of the integrated moveable part is provided.

When the integrated moveable part of the handling device comprises a releasable soft sling securing device, the device in a locked mode at least securing the soft sling from detaching from the handling device, a preferred and important embodiment is disclosed.

When the integrated moveable part of the handling device extends out of an opening in the nacelle housing, the opening being large enough to get hands or the like members out of it while the integrate moveable part also extends out of it, a simple solution is provided where it may also be possible to reach out and haul a soft sling in a substantially horizontal direction into the nacelle and attach and secure the soft sling to the moveable part in its first position. Alternatively, a soft sling may be attached or secured to the integrated moveable part in its second position, e.g. by reaching out of the nacelle through the opening. Alternatively or additionally, a further hatch or opening may be provided adjacent to each handling device.

When the integrated moveable part, of which at least an endmost part extends out of the nacelle housing in the second position, is provided in a recess in the outer surface of the nacelle housing in the first position, a way of providing an integrated moveable part which is flush with the outer surface in its first position is provided. An alternative or additional way is to provide a moveable part where an outmost part of the integrated moveable part is a moveable part of the nacelle housing, possibly provided in the same material as that of the nacelle housing.

When the integrated moveable part of the handling devices, such as a linear spindle or linear actuator or pneumatic cylinder, performs a linear movement when moving between the first and the second position, or when the integrated moveable part, such as a hinge, performs a rotating movement when moving between the first and the second position, possible embodiments of the handling device are provided.

When the at least four handling devices are of a kind where a movement in a direction from the first to the second position of one of the integrated moveable parts increases a width of the nacelle measured between two opposing handling devices, a possible advantage is that a solution particularly suited for a relatively fragile nacelle housing is provided.

In accordance with a second aspect of the invention there is provided a method of handling a wind turbine nacelle, the wind turbine nacelle comprising
 a supporting structure,
 a nacelle housing,
 at least four handling devices,
 the at least four handling devices being connected to the supporting structure,
 each of the at least four handling devices comprising an integrated moveable part, the method comprising
 moving the integrated moveable part from a first position to a second position,
 attaching a load transferring structure, such as a soft sling, to the integrated moveable part in the second position,
 moving the nacelle by
 applying a lifting force to the handling devices via the load transferring structure and the integrated moveable part.

Thus, an improved method of handling a wind turbine nacelle is provided. The advantages described and explained for the first aspect generally also apply for the method aspect of the invention.

It is to be understood that any advantage mentioned may be seen as a possible advantage provided by the invention, but it may also be understood that the invention is particularly, but not exclusively, advantageous for obtaining the described advantage.

In general, the various aspects and advantages of the invention may be combined and coupled in any possible way within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
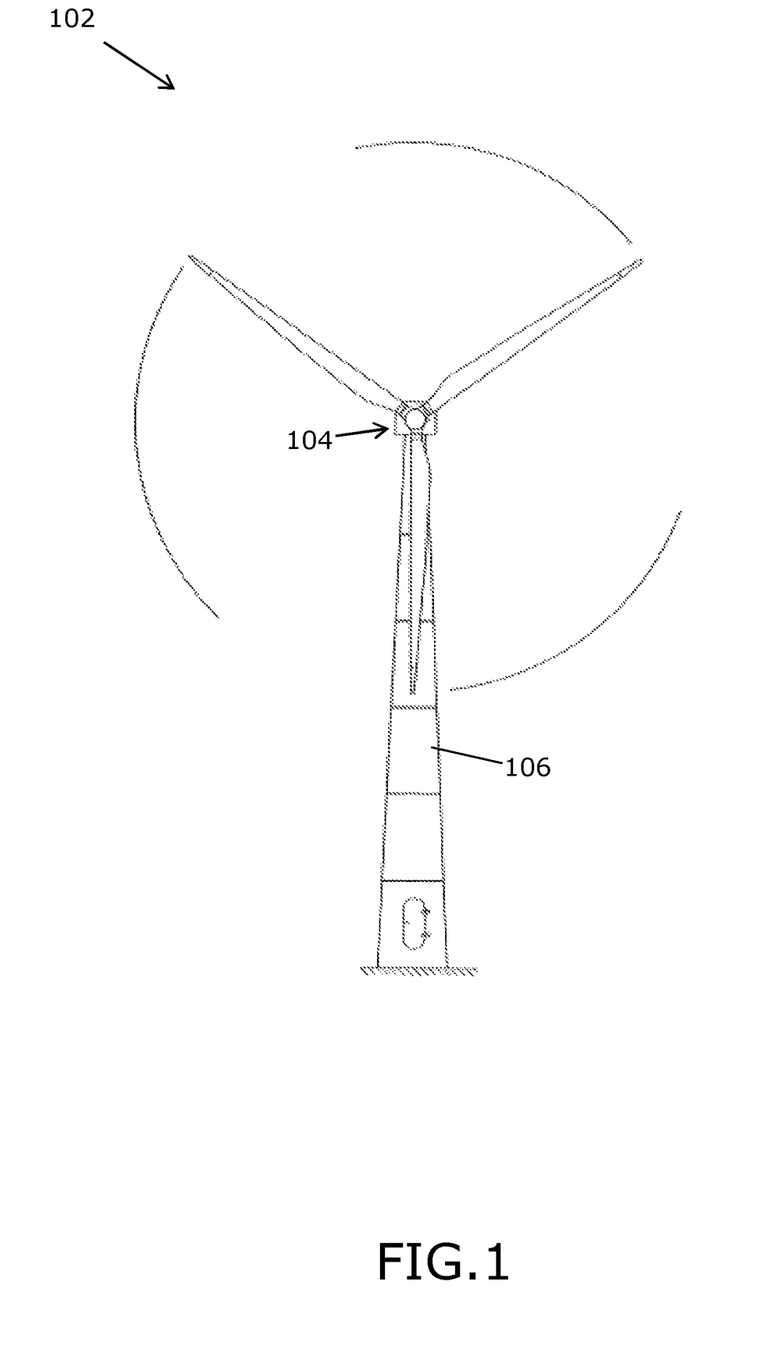
FIG. 1 shows a wind turbine.

FIG. 1 shows a wind turbine 102 with a nacelle 104, and a hub rotatably mounted to the nacelle 104 via a shaft. The nacelle 104 is rotatably mounted on top of a wind turbine tower 106 via a supporting structure (not seen) in the nacelle 104.

Figure 2:
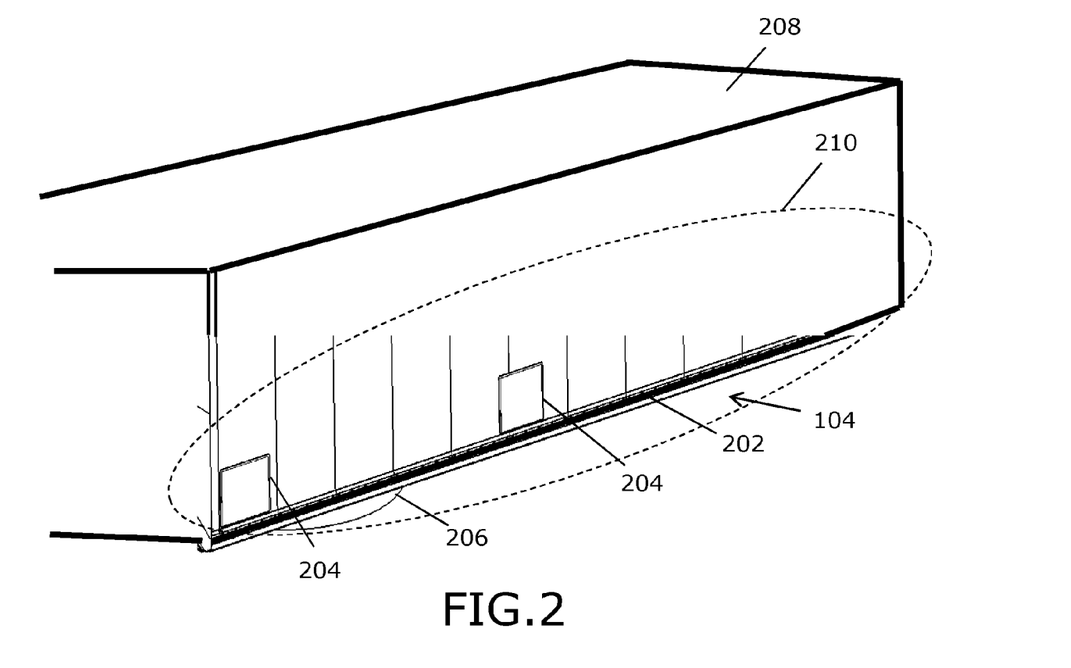
FIG. 2 shows a perspective side view of a top and a side of a wind turbine nacelle.

FIG. 2 shows a perspective side view of a top and a side of the wind turbine nacelle 104. The figure shows two closed hatches 204 positioned on a lower half 210 of the side of an outer surface 208 of a nacelle housing 202 of the wind turbine nacelle 104. In a middle of a bottom part of the nacelle a yaw bearing 206 is illustrated. The yaw bearing 206 is connected to further nacelle supporting structures, such as metal beams and/or plates (not seen in the figure) in the nacelle.

Figure 3:
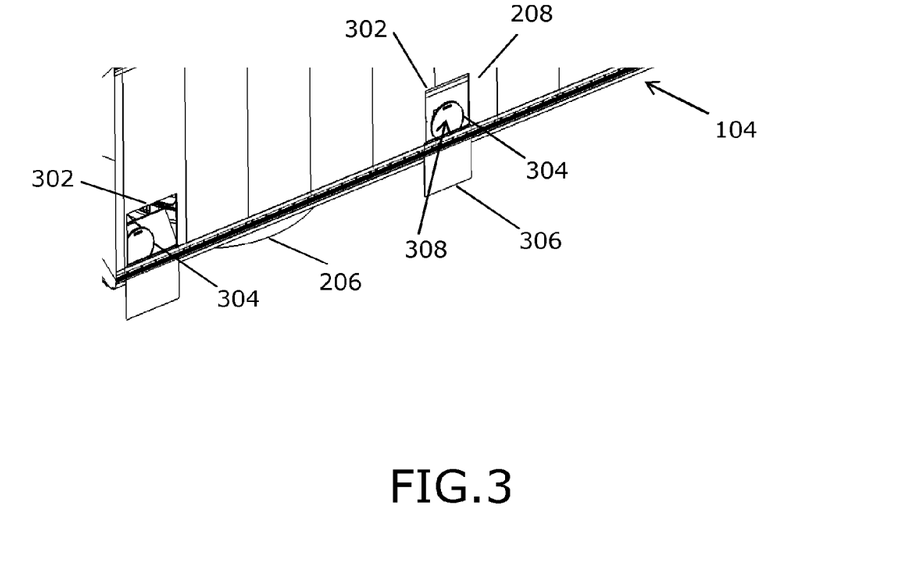
FIG. 3 shows a section of a lower side of the nacelle where an integrated moveable part of two handling devices is in a first position inside a nacelle housing.

FIG. 3 shows a section of the side of the nacelle where an integrated moveable part 304 of two side handling devices is in a first position 308 inside the nacelle housing 202. The hatches are shown when opened 306, and hereby two openings 302 in the nacelle housing 202 side are provided for the integrated moveable parts 304 to extend out of. On an opposing side (not seen) of the nacelle two other openings with handling devices inside are provided. The four handling devices, each with an integrated moveable part 304, are preferably provided pairwise. A length-wise distance to each of these pairs, from a centre of gravity of the nacelle, is preferably predetermined in order to balance lifting points relative to the centre of gravity of the nacelle.

Figure 4:
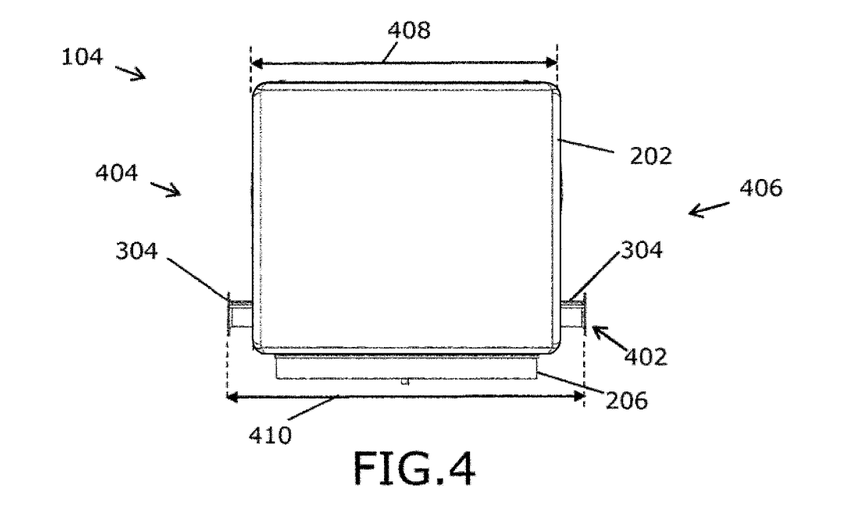
FIG. 4 is a view from an end of the nacelle where an integrated moveable part of each of the handling devices is shown in a second position extending out of the sides of the nacelle housing.

FIG. 4 is a view from an end of the nacelle where the integrated moveable part 304 of a side 404 and another side 406 handling device is shown in a second position 402 extending out of the sides. In the second position 402, at least an endmost part of, the integrated moveable member extends out of the nacelle housing.

Behind each of the handling devices, in a length-wise direction of the nacelle, a further handling device (not seen) is preferably positioned in each side, providing a total of four handling devices.

A movement, in a direction from the first to the second position 402 of one of the integrated moveable parts 304, increases a width 410 of the nacelle measured between two opposing handling devices. The width at 408 illustrates the width of the nacelle 104 when the integrated moveable parts are in their first position inside or flush with the nacelle housing 202. A width 410 illustrates the width of the nacelle measured between two opposing handling devices, when an integrated moveable part of one or both of the handling devices are in their second position 402.

Figure 5:
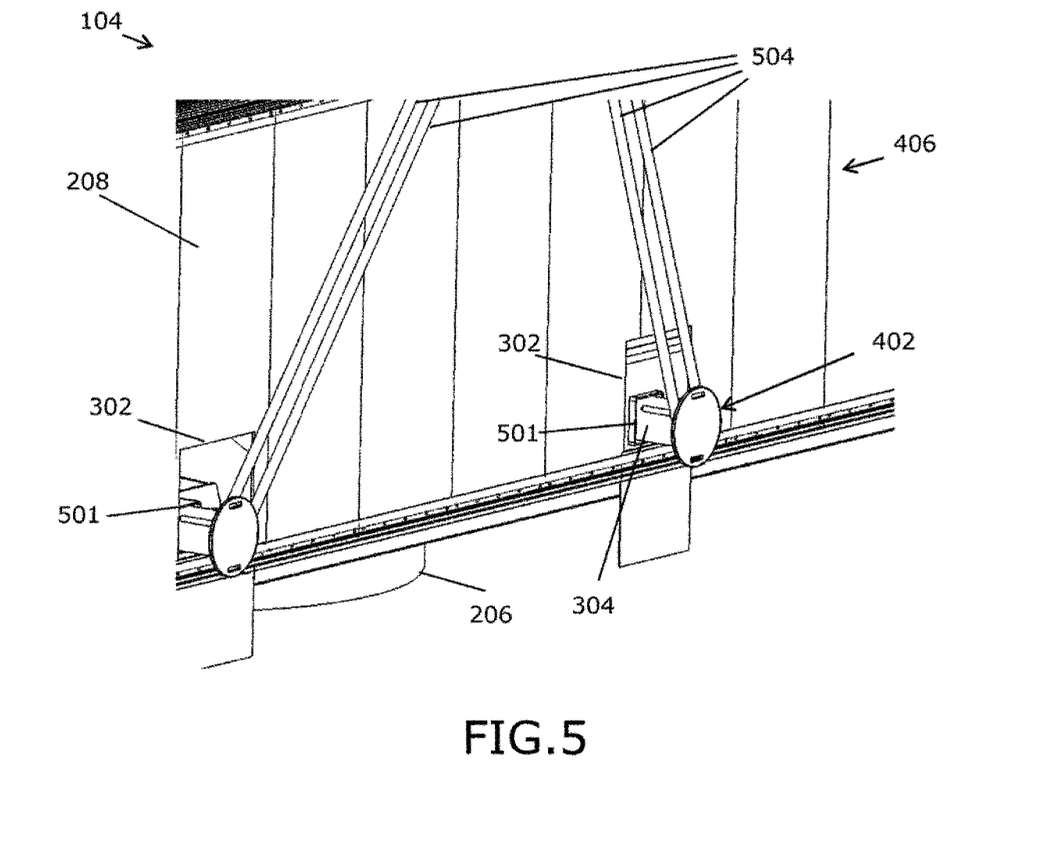
FIG. 5 is a close up view of a section of the side of the nacelle showing two handling devices and their integrated moveable parts in the second position, FIGS. 6.1-6.3 show a side view of the nacelle, an end view of the nacelle in a situation where integrated moveable parts of the handling devices are in their first position and a situation where they are in their second position, respectively, FIGS. 7.1-7.3 show a second embodiment of the nacelle with handling devices in side-view and end-view with the integrated moveable parts in their first and second position.

FIG. 5 is a close-up view of a section of the lower side 406 of the nacelle 104 showing the two handling devices 501 with their integrated moveable part extended through the openings 302 to their second position 402 in which they are ready for use, i.e. extending out of the nacelle housing, by attaching a soft sling securing device 504 to the integrated moveable part 304. It can be seen that an outmost end of the integrated moveable part is above a bottom level of the nacelle or yaw bearing when the nacelle is positioned on the yaw bearing 206 and the integrated moveable part is in its second position.

It is illustrated in the figure that the moveable part of the handling device comprises a releasable soft sling securing device 504, the device 504 in a locked mode at least securing the soft sling securing device 504 from detaching from the integrated moveable part 304 of the handling device 501.

Figure 61:
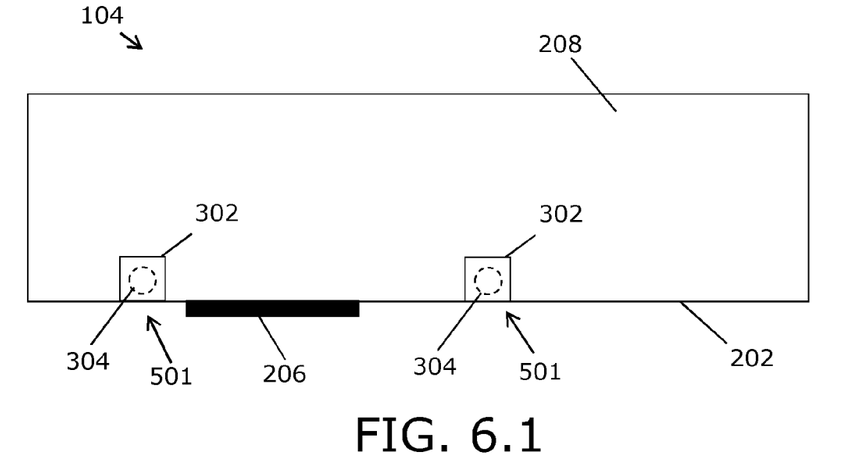
Figure 62:
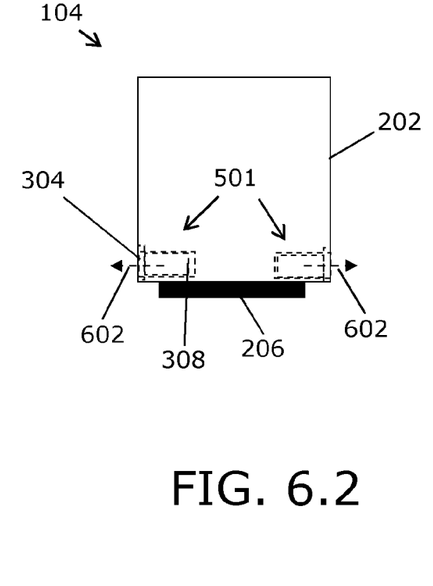
Figure 63:
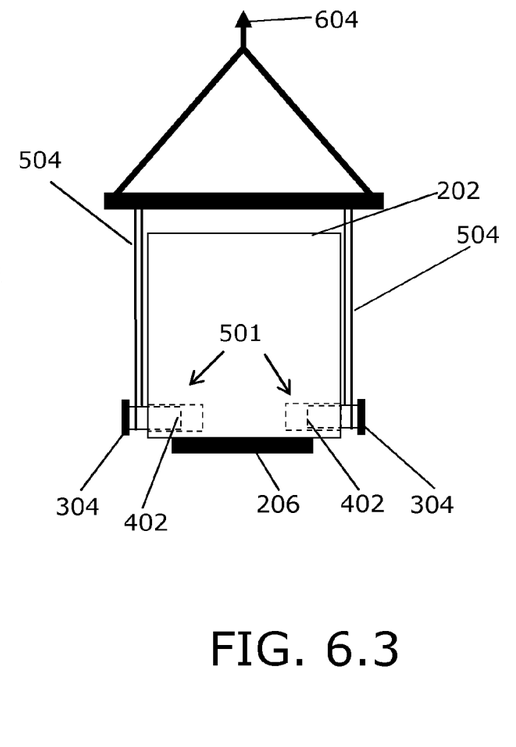

FIG. 6.1 is a simplified illustration of a side view of the nacelle 104 with openings 302 in the nacelle housing 202 and showing the yaw bearing 206. Furthermore, in FIG. 6.2 there is illustrated an end view of the nacelle 104 in a first situation where the integrated moveable parts 304 of the handling devices 501 are in their first position 308, and in FIG. 6.3 a situation where the integrated moveable parts 304 are in their second position 402.

In the figures it is illustrated how the wind turbine nacelle, including the supporting structure 206 and additional supporting structure inside the nacelle housing, can be moved with use of at least four handling devices 501 connected to the supporting structure 206. Handling is provided by moving the integrated moveable part 304 from a first position 308 to a second position 402, attaching a load transferring structure, such as a soft sling securing device 504, a wire or a strap or the like, to the integrated moveable part 304 in the second position 402 and moving the nacelle 104 by applying a lifting force 604 to the handling devices 501 via the soft sling securing device 504 and the integrated moveable part 304.

The figure shows an embodiment where the integrated moveable part of the handling devices, such as a linear spindle or actuator, performs a linear movement 602 when moving between the first 308 and the second position 402.

Figure 71:
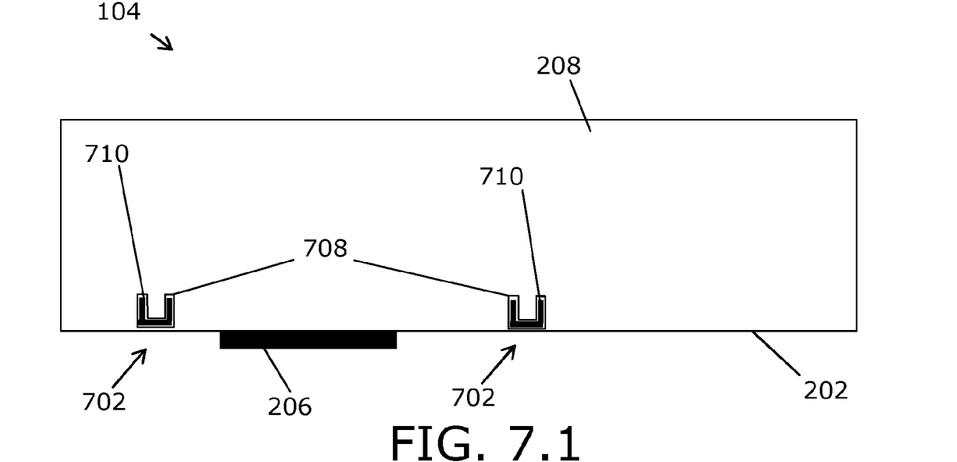
Figures 72, 73:
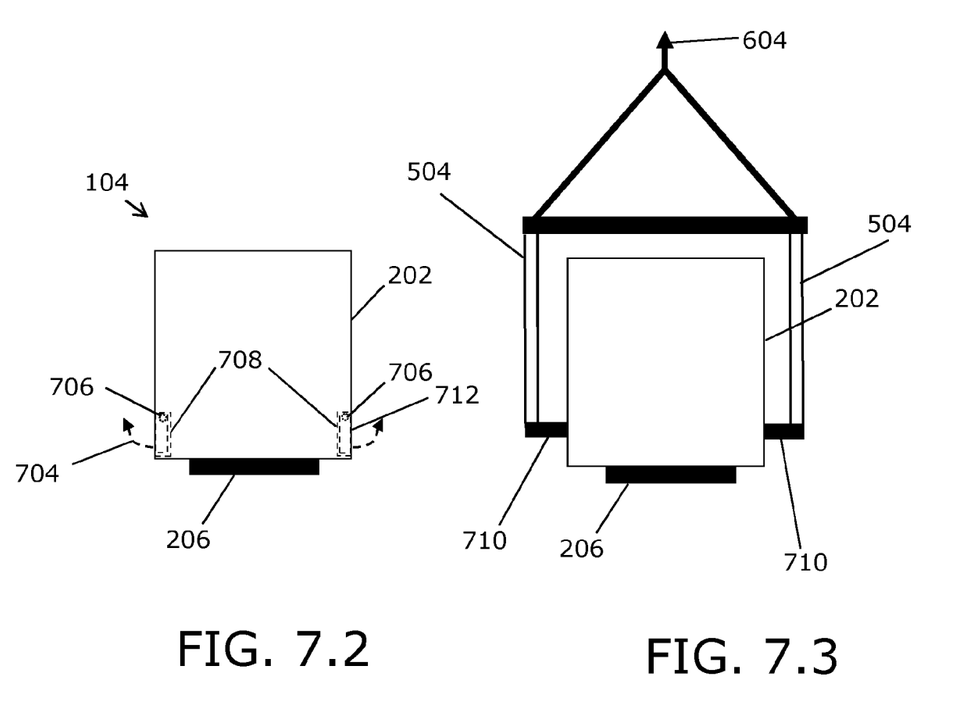

FIGS. 7.1-7.3 show a second embodiment of the nacelle 104 with the nacelle housing 202 with handling devices in which the handling devices are of a hinge type. The figures show the nacelle in side-view in FIG. 7.1 and in end-view in FIGS. 7.2 and 7.3 with the integrated moveable parts 710 in their first and second position. The integrated moveable part 710 is of a kind able to perform a rotating movement 704 around a pivoting or hinge point 706 when moving between the first and the second position. The figure also illustrates an integrated moveable part, which is provided in a recess and is flush with the outer surface in the first position and is extending out of the nacelle housing in the second position.

The figure also illustrates that the integrated moveable part of a handling device may be flush 712 with the nacelle housing prior to being activated towards its second position. In the shown example this is embodied by providing an indentation 708 in the outer surface 208 of the nacelle housing, but this may alternatively be provided by the outmost part of the integrated moveable part being a moveable part of the nacelle housing. This may also be embodied by a handling device of the linear moveable type. Adjacent to the indentation, such as above the indentation, a further hatch (not shown) may possibly be provided in order to be able to attach and/or secure the soft slings to the moveable part in the second position by personnel positioned inside the nacelle, e.g. when the nacelle is being positioned on its final position on top of the tower of the wind turbine.

FIG. 7 shows that the wind turbine nacelle 104 including the supporting structure 206 and additional supporting structure inside the nacelle housing can be moved with use of at least four handling devices 702 connected to the supporting structure 206. Handling is provided by moving the integrated moveable part 710 of each of the handling devices from a first position to a second position, attaching a load transferring structure, such as a soft sling securing device 504, to the integrated moveable part 710 in the second position and moving the nacelle 104 by applying a lifting force 604 to the handling devices 501 or 702 via the load soft sling securing device 504 and the integrated moveable part 710.

In short it is herein disclosed that in order e.g. to increase safety, flexibility and simplicity when handling a wind turbine nacelle 104 compared to known solutions and devices there is disclosed a wind turbine nacelle 104 including a supporting structure 206, a nacelle housing 202 and at least four handling devices 501, 702 to be used when handling the wind turbine nacelle 104. The at least four handling devices 501, 702 are connected to supporting structure, and each of the at least four handling devices includes an integrated moveable part 304. The integrated moveable part 304 is moveable between a first position 308 and a second position 402, and the integrated moveable part is inside or is flush with the nacelle housing in the first position 308 and is extending out of the nacelle housing in the second position 402.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality.

The invention claimed is:

1. A wind turbine nacelle comprising:
a supporting structure,
a nacelle housing,
a plurality of handling devices each connected to the supporting structure and adapted to support the wind turbine nacelle during handling, wherein each of the plurality of handling devices comprises an integrated moveable part moveable between a first position where the integrated moveable part is entirely inside the nacelle housing or is flush with the nacelle housing so that no portion of the integrated moveable part extends beyond the nacelle housing, and a second position where the integrated moveable part is extending outwardly of the nacelle housing.

2. The wind turbine nacelle according to claim 1, wherein the plurality of handling devices includes at a pair of handling devices positioned on opposed sides of the nacelle housing.

3. The wind turbine nacelle according to claim 1, wherein the plurality of handling devices include integrated movable parts that extend from a lower portion of a side of the nacelle housing.

4. The wind turbine nacelle according to claim 1, wherein the plurality of handling devices are positioned adjacent to a bottom part of the supporting structure.

5. The wind turbine nacelle according to claim 1, wherein the integrated moveable part of the handling device which extends out of the nacelle housing in the second position comprises a structure adapted to transfer load to a soft sling.

6. The wind turbine nacelle according to claim 5, wherein the integrated moveable part of the handling device which extends out of the nacelle housing in the second position comprises a releasable soft sling securing device, the device in a locked mode at least securing the soft sling from detaching from the handling device.

7. The wind turbine nacelle according to claim 1, wherein the integrated moveable part of the handling device which extends out of the nacelle housing in the second position extends through an opening in the nacelle housing.

8. The wind turbine nacelle according to claim 1, wherein the integrated moveable part of the handling devices is moved in a linear movement when moving between the first and the second position.

9. The wind turbine nacelle according to claim 1, wherein the integrated moveable part performs a rotating movement when moving between the first and the second position.

10. The wind turbine nacelle according to claim 1, wherein movement in a direction from the first to the second position of one of the integrated moveable parts increases a width of the nacelle measured between two opposing handling devices.

11. A wind turbine comprising a wind turbine nacelle according to claim 1.

12. The wind turbine nacelle according to claim 1, wherein each of the plurality of handling devices remain connected to the supporting structure during movement between the first and second positions.

13. A method of handling a wind turbine nacelle, the method comprising:
providing the wind turbine nacelle with a plurality of handling devices,
moving an integrated moveable part of each of the plurality of handling devices from a first position, where the integrated moveable part is entirely inside a housing of the wind turbine nacelle or flush with the housing of the wind turbine nacelle, to a second position, where the integrated moveable part is outward of the housing of the wind turbine nacelle,
attaching a load transferring structure to the integrated moveable part in the second position, and
moving the nacelle by
applying a lifting force to the handling devices via the load transferring structure and the integrated moveable part.

14. The method according to claim 13, where moving the integrated moveable part is performed from outside the housing of the nacelle.

15. The method according to claim 13, where the load transferring structure is attached from inside the housing of the nacelle.

16. The method according to claim 13, where moving the nacelle and applying load to the handling devices via the load transferring structure and the integrated moveable part is provided by
lifting the nacelle with a crane,
attaching soft slings to the integrated part of the plurality of handling devices, and
lifting the nacelle when each of the integrated parts are in their second position.

17. The method according to claim 13, wherein moving the integrated moveable part from the first position to the second position further comprises moving the integrated moveable part in a linear movement when moving between the first and second position.

18. A wind turbine nacelle comprising:
a supporting structure,
a nacelle housing,
a plurality of handling devices adapted to support the wind turbine nacelle during handling, each of the plurality of handling devices being generally positioned inside the nacelle housing and connected to the supporting structure, and comprising an integrated moveable part, wherein the integrated moveable part is moveable between a first position where the integrated moveable part is entirely inside the nacelle housing, and a second position where the integrated moveable part is extending outwardly of the nacelle housing, and wherein the integrated moveable part of the handling devices is moved in a linear movement when moving between the first and the second position.

* * * * *

UNITED STATES PATENT AND TRADEMARK OFFICE
CERTIFICATE OF CORRECTION

| | | |
|---|---|---|
| PATENT NO. | : 8,992,178 B2 | Page 1 of 1 |
| APPLICATION NO. | : 13/202276 | |
| DATED | : March 31, 2015 | |
| INVENTOR(S) | : Gunnar Kamp Storgaard Pedersen | |

It is certified that error appears in the above-identified patent and that said Letters Patent is hereby corrected as shown below:

In the Claims:

At column 7, claim number 2, line number 28, after "includes" delete "at"

Signed and Sealed this
Twenty-fourth Day of November, 2015

Michelle K. Lee
*Director of the United States Patent and Trademark Office*